United States Patent
Jones et al.

(10) Patent No.: US 10,104,551 B2
(45) Date of Patent: *Oct. 16, 2018

(54) SYSTEMS AND METHODS FOR CONTROLLING MOBILE DEVICE USE

(71) Applicant: Wal-Mart Stores, Inc., Bentonville, AR (US)

(72) Inventors: Matthew Allen Jones, Bentonville, AR (US); Daniel R. Shields, Rogers, AR (US); Marc Ashley Fletter, Bentonville, AR (US); Nicholaus Adam Jones, Fayetteville, AR (US); Robert James Taylor, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,022

(22) Filed: Dec. 21, 2017

(65) Prior Publication Data

US 2018/0115902 A1   Apr. 26, 2018

Related U.S. Application Data

(63) Continuation of application No. 15/094,137, filed on Apr. 8, 2016, now Pat. No. 9,900,777.

(Continued)

(51) Int. Cl.
*H04W 4/02* (2018.01)
*H04W 48/04* (2009.01)
(Continued)

(52) U.S. Cl.
CPC .............. *H04W 12/08* (2013.01); *H04W 8/18* (2013.01); *H04W 8/183* (2013.01); *H04L 63/105* (2013.01)

(58) Field of Classification Search
CPC .......................... H04W 48/04; H04W 4/021
See application file for complete search history.

(56) References Cited

U.S. PATENT DOCUMENTS

| 7,440,573 B2* | 10/2008 | Lor | ........................ H04L 63/107 |
| | | | 370/235 |
| 7,826,835 B2* | 11/2010 | Rothman | .............. H04W 88/02 |
| | | | 348/211.2 |

(Continued)

FOREIGN PATENT DOCUMENTS

EP    0988765 A1    3/2000

OTHER PUBLICATIONS

"Mobile Device Manager v. 7.3: Admin Guide", Oct. 14, 2014, Apptix, 51 pages.

(Continued)

*Primary Examiner* — Christopher M Brandt
(74) *Attorney, Agent, or Firm* — Schmeiser, Olsen & Watts LLP

(57) ABSTRACT

Provided are a system and method for operating a mobile device, comprising: establishing by a locking mechanism at the mobile device that the mobile device is owned or controlled by a retail establishment at which an operator of the mobile device is an agent; searching, by a mobile device, for a signal from a network; authorizing the mobile device to operate in a vicinity of the network when the signal is detected from the network; and inactivating the mobile device or displaying information where the mobile device can operate in response to a failure by the mobile device to detect the signal.

12 Claims, 5 Drawing Sheets

Related U.S. Application Data

(60) Provisional application No. 62/145,823, filed on Apr. 10, 2015.

(51) Int. Cl.
  *H04W 12/08* (2009.01)
  *H04W 8/18* (2009.01)
  *H04L 29/06* (2006.01)

(56) References Cited

U.S. PATENT DOCUMENTS

| | | | |
|---|---|---|---|
| 8,254,957 B2* | 8/2012 | Ferren | H04M 1/72577 455/26.1 |
| 8,549,656 B2 | 10/2013 | Blaisdell et al. | |
| 8,620,269 B2 | 12/2013 | Johar et al. | |
| 8,769,063 B2 | 7/2014 | Barton et al. | |
| 9,020,848 B1* | 4/2015 | Ridge | G06Q 40/125 705/32 |
| 2003/0008662 A1* | 1/2003 | Stern | H04M 1/72572 455/456.1 |
| 2006/0160562 A1* | 7/2006 | Davis | H04M 1/673 455/550.1 |
| 2007/0270122 A1* | 11/2007 | Ewell, Jr. | H04M 1/66 455/404.2 |
| 2010/0159877 A1* | 6/2010 | Salkini | H04W 48/04 455/411 |
| 2011/0092159 A1* | 4/2011 | Park | H04L 63/102 455/41.2 |
| 2012/0021724 A1* | 1/2012 | Olsen | G06F 21/35 455/411 |
| 2012/0094690 A1* | 4/2012 | Harris | G06F 21/10 455/456.1 |
| 2012/0284779 A1* | 11/2012 | Ingrassia, Jr. | G06F 21/70 726/5 |
| 2012/0302204 A1* | 11/2012 | Gupta | H04M 15/44 455/406 |
| 2013/0285855 A1* | 10/2013 | Dupray | G01S 19/48 342/451 |
| 2013/0298185 A1 | 11/2013 | Koneru et al. | |
| 2013/0316703 A1 | 11/2013 | Girard et al. | |
| 2013/0316737 A1* | 11/2013 | Guba | G08G 1/20 455/456.4 |
| 2013/0347054 A1* | 12/2013 | Motoyama | G06F 21/6218 726/1 |
| 2014/0007215 A1 | 1/2014 | Romano et al. | |
| 2015/0327011 A1* | 11/2015 | Fairbanks | G07C 1/10 455/456.3 |
| 2016/0134660 A1* | 5/2016 | Ponsini | H04L 63/20 726/1 |

OTHER PUBLICATIONS

Non-Final Office Action in U.S. Appl. No. 15/094,137, dated Jul. 11, 2017; 11 pages.

Notice of Allowance in U.S. Appl. No. 15/094,137, dated Oct. 25, 2017; 5 pages.

* cited by examiner

This device is owned by Company, Inc. Please call 555-1212 if you have this device.

SYSTEMS AND METHODS FOR CONTROLLING MOBILE DEVICE USE

RELATED APPLICATION

This application is a continuation application of U.S. patent application Ser. No. 15/094,137 filed on Apr. 8, 2016, entitled "Systems and Methods for Controlling Mobile Device Use," which claims priority to U.S. Provisional Application Ser. No. 62/145,823, filed on Apr. 10, 2015 entitled "Systems and Methods for Controlling Mobile Device Use", the entirety of each of which is incorporated by reference herein.

FIELD

The present concepts relate generally to mobile device use, and more specifically, to the controlled use of a mobile device at a retail establishment.

BACKGROUND

Data entry terminals, bar code scanners, and so on, for example, manufactured by Telxon Corporation, are well-known for use in point-of-sale and related retail applications. Company employees often use their smartphones or related mobile electronic devices for both personal and work-related purposes.

BRIEF SUMMARY

In one aspect, provided is a method for operating a mobile device, comprising: establishing by a locking mechanism at the mobile device that the mobile device is owned or controlled by a retail establishment at which an operator of the mobile device is an agent; searching, by a mobile device, for a signal from a network; authorizing the mobile device to operate in a vicinity of the network when the signal is detected from the network; and inactivating the mobile device or displaying information where the mobile device can operate in response to a failure by the mobile device to detect the signal.

In some embodiments, the signal from the network includes a service set identification (SSID).

In some embodiments, the method further comprises activating the mobile device for access to applications executable by the mobile device in response to a detection of the signal.

In some embodiments, inactivating the mobile device comprises at least one of preventing a bootup of the mobile device, preventing applications of the mobile device from deploying, preventing applications from displaying as an option, and allowing certain actions to be performed in an application In some embodiments, the signal of the network is searched in response to selecting an application at the mobile device.

In some embodiments, the vicinity of the network includes a workplace facility, and wherein the mobile device is operated by an agent of the workplace facility.

In some embodiments, the mobile device is locked if the agent is an hourly wage pay type and the mobile device is not in the vicinity of the network.

In another aspect, provided is a method for operating a mobile device, comprising: providing a profile on the mobile device; identifying by the profile an owner of the mobile device and rights of a user regarding use of the mobile device; permitting, by the profile, the mobile device to search for a signal from a network for operating in the vicinity of the network; identifying applications on the mobile device for use outside of the network; and checking whether an application of the applications is permitted to operate.

In some embodiments, the mobile device is a store owned or company owned electronic device having a display for presenting data related to the applications.

In some embodiments, the method further comprises installing registry entries from the profile on the mobile device, permitting the mobile device to search for the signal from the network.

In some embodiments, searching for the signal determines when the mobile device is within range of the signal.

In some embodiments, the registry entries include data for identifying an owner of the mobile device, and wherein the application of the applications is permitted to operate depending on the owner of the mobile device.

In some embodiments, the signal is searched when the application is selected to determine whether the application is permitted to operate.

In some embodiments, the mobile device is a bring your own device (BYOD), and the owner of the mobile device and the user of the mobile device are the same.

In some embodiments, the signal is detected but the mobile device is not authenticated, and is prohibited from connecting to the network.

In another aspect, provided is a method for operating a mobile device, comprising: providing a locking mechanism in an application configured at a mobile device; launching the application; determining whether a signal is detected from a network; determining whether the application can be used outside of the network; displaying options for a user of the application who receives payment for services rendered in a form of a salary; and disabling the application for a user of the application who receives the payment for in a form of a wage.

In some embodiments, disabling the mobile device comprises at least one of preventing a bootup of the mobile device, preventing applications of the mobile device from deploying, preventing applications from displaying as an option, and allowing certain actions to be performed in an application.

In another aspect, provided is a system for controlling access of a mobile device, comprising: a locking mechanism that determines whether the mobile device is store-owned, searches for a signal from a network, and inactivates the mobile device in response to a determination that the mobile device is store-owned and the signal is not detected; and a lockout system that establishes conditions under which the mobile device or at least one application of the mobile device are locked.

In some embodiments, the lockout system searches for the signal after at least one of power-up of the mobile device and after an application is launched at the mobile device.

In some embodiments, the locking mechanism receives data from the lockout system to determine an ownership of the mobile device, including determining whether the mobile device is store-owned, company-owned, or user-owned.

In some embodiments, the locking mechanism determines an access level of the mobile device, and locks the mobile device or the application in response to the access level being less than a predetermined threshold.

In another aspect, provided is a system for controlling access of a mobile device, comprising: means for establishing conditions under which the mobile device or at least one application of the mobile device are locked; and means for locking the mobile device or an application of the mobile device if the mobile device is outside of the vicinity of a network and the mobile device's access level is less than a predetermined threshold access level.

In some embodiments, the system further comprises means for determining an ownership of the mobile device, including determining whether the mobile device is store-owned, company-owned, or user-owned.

In some embodiments, means for establishing conditions under which the mobile device or at least one application of the mobile device are locked includes determining an access level of the mobile device.

In some embodiments, the system further comprises means for performing an action or task-based authentication.

In some embodiments, the access level is a pay type of the agent.

BRIEF DESCRIPTION OF THE SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts.

FIG. 4 is a view of a message displayed on a mobile device prevented from booting, in accordance with some embodiments.

DETAILED DESCRIPTION

Company information technology (IT) groups often configure mobile devices under a "Bring Your Own Device" (BYOD) corporate strategy, where an employee or agent personal mobile device is provisioned with applications that permit the use of the personal mobile device in a work environment. However, issues arise with regarding to maintaining adequate security, and risks associated with abuse by mobile device users authorized to access a company network remotely. For example, a mobile device user may be an hourly or wage-earning employee, contractor, or agent who is not permitted to, but may nevertheless attempt to, perform work-related tasks from the mobile device when "off-the-clock" or not on premises during work hours.

Figure 1:
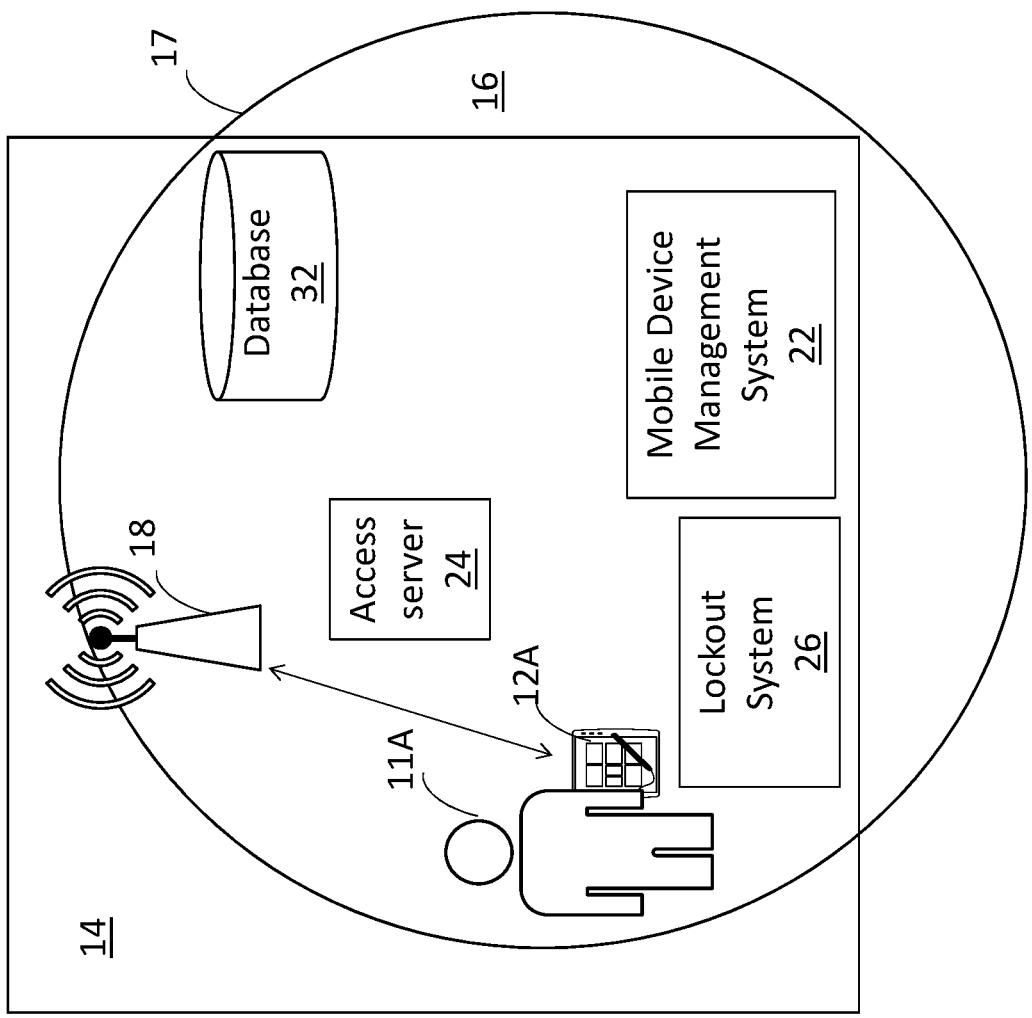
FIG. 1 is a network diagram of an environment in which embodiments can be practiced.
Figure 1:
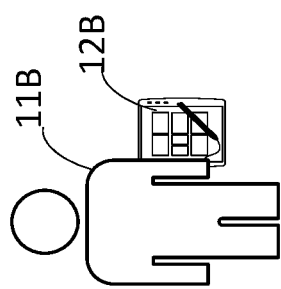

FIG. 1 is a network diagram of an environment in which embodiments can be practiced.

The environment includes a retail establishment 14 having a local store network 16. The local store network 16 can incorporate a local area wireless technology such as WiFi, which may include an access point 18 and access server 24 and/or other well-known WiFi elements (not shown), for providing Internet access and internetworking services between mobile electronic devices, or more generally, mobile devices such as smartphones or the like, in the WiFi coverage area 16.

One or more company representatives 11A, 11B (generally, 11), such as employees, contractors, or other agents or users, may perform job-related functions on a mobile device 12A, 12B (generally, 12). User 11A and mobile device 12A may be proximal to or inside the store network 16. User 11B and mobile device 12B are outside the store network 16. Either company representative 11A, 11B may be a store manager or other authorized representative of the retail establishment 14 who wishes to upload sensitive data to the mobile device 12A, 12B, respectively, such as employee files stored electronically. As described herein, such tasks may be performed depending on, but not limited to, user agent status, access level, pay type (wage earner or salaried), location of user, and/or application executed for performing the task. Mobile devices 12A, 12B in accordance with some embodiments can be configured for multitasking, for example, where the user 11A, 11B can perform personal tasks such as emailing and web browsing and/or job-related activities. Accordingly the mobile devices 12A, 12B can each include one or more applications that are stored at the mobile devices 12A, 12B and, when executed at the mobile devices 12A, 12B, can be used for performing personal and/or job functions.

When performing job functions, the mobile device 12A may receive authorization from the access server 24 at the store network 16, for example, inside the store's sub-network, or demilitarized zone (DMZ), to operate in a vicinity of the network 16, for example, the store's WiFi network, and to provide the user 11A with remote access to data stored at database 32, for example, behind a firewall (not shown), which may be physically present at the store 14, or at a remote location and in communication with the other electronic components via the network 16. The mobile device 12B on the other hand is not within proximity of the store network 16, and therefore may not receive relevant signals from the access point 18 for establishing authentication or the like, or otherwise communicating with the network 16. Mobile device 12B may therefore be restricted from some or all work-related use in accordance with some embodiments, for example, described herein. However, user 11B may use mobile device 12B for personal use, depending on whether the user 11B owns the mobile device 12B, and also depending on whether the application executed on the mobile device 12B is permissible outside of the store network 16.

A mobile device management system 22 may communicate with the network 16 to dynamically deploy relevant mobile device applications on the mobile devices 12 required by the company representatives 11 to perform their job functions. The mobile device management system 22 may be located at the store network 16, or be physically separate from and in communication with other elements at the store network 16. The mobile device management system 22 may include a commercially available application management system, such as an AirWatch® Mobile Application Management platform.

Figure 5A:
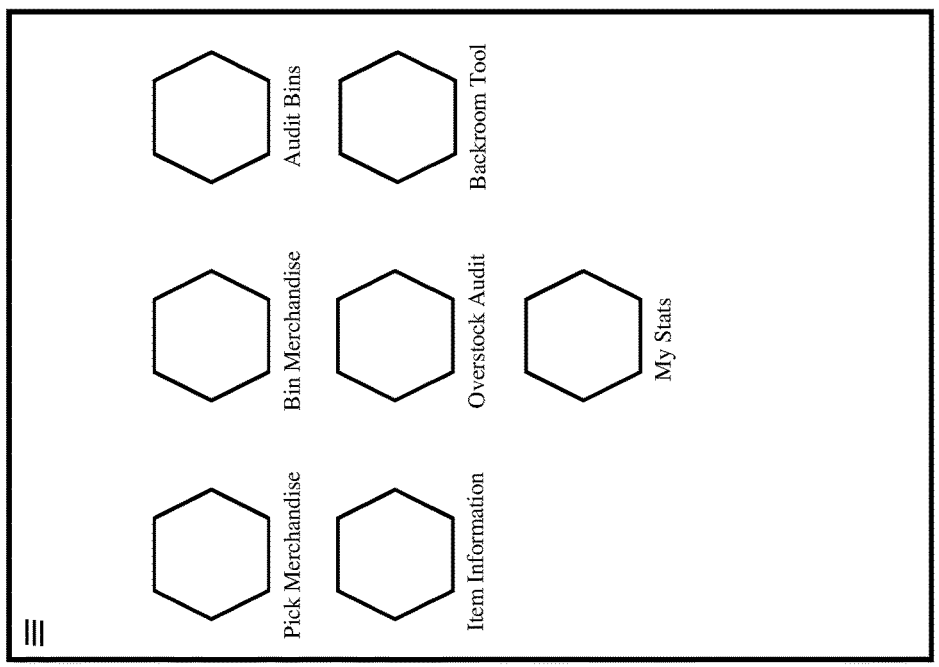
FIGS. 5A and 5B are views of a mobile device displaying applications, in accordance with some embodiments.
Figure 5B:
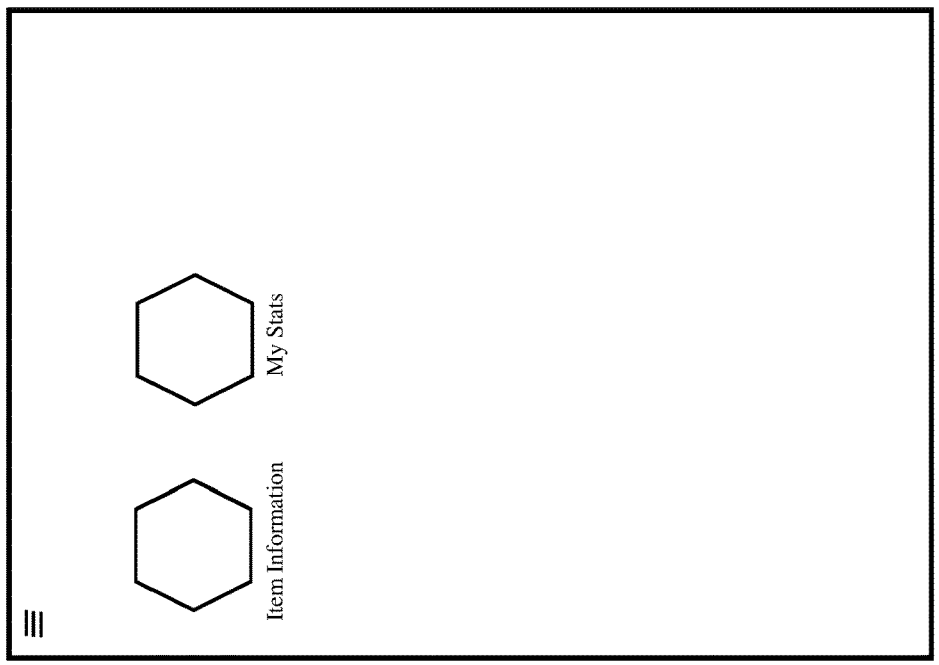

In some embodiments, a lockout system 26 may be provided that communicates with the mobile device 12 in a manner depending on the location of the locking mechanism 44 (described below) of the mobile device 12, and may provide data to the mobile device 12 that is used for determining conditions under which the mobile device 12 may be locked, or applications of the mobile device 12 that may be prevented from use. The lockout system 26 can therefore deter theft of the mobile device 12. Related functions performed by the lockout system 26 may include but not be limited to preventing device bootup (for example, shown in the screenshot of FIG. 4), hiding or otherwise inactivating mobile device applications, preventing applications from deploying or executing, hiding or preventing options in an application, and so on. For example, applications used for performing job functions such as bin merchandise, etc. shown in FIG. 5A are prevented from use by removing them from the display as shown in FIG. 5B.

Figure 2:
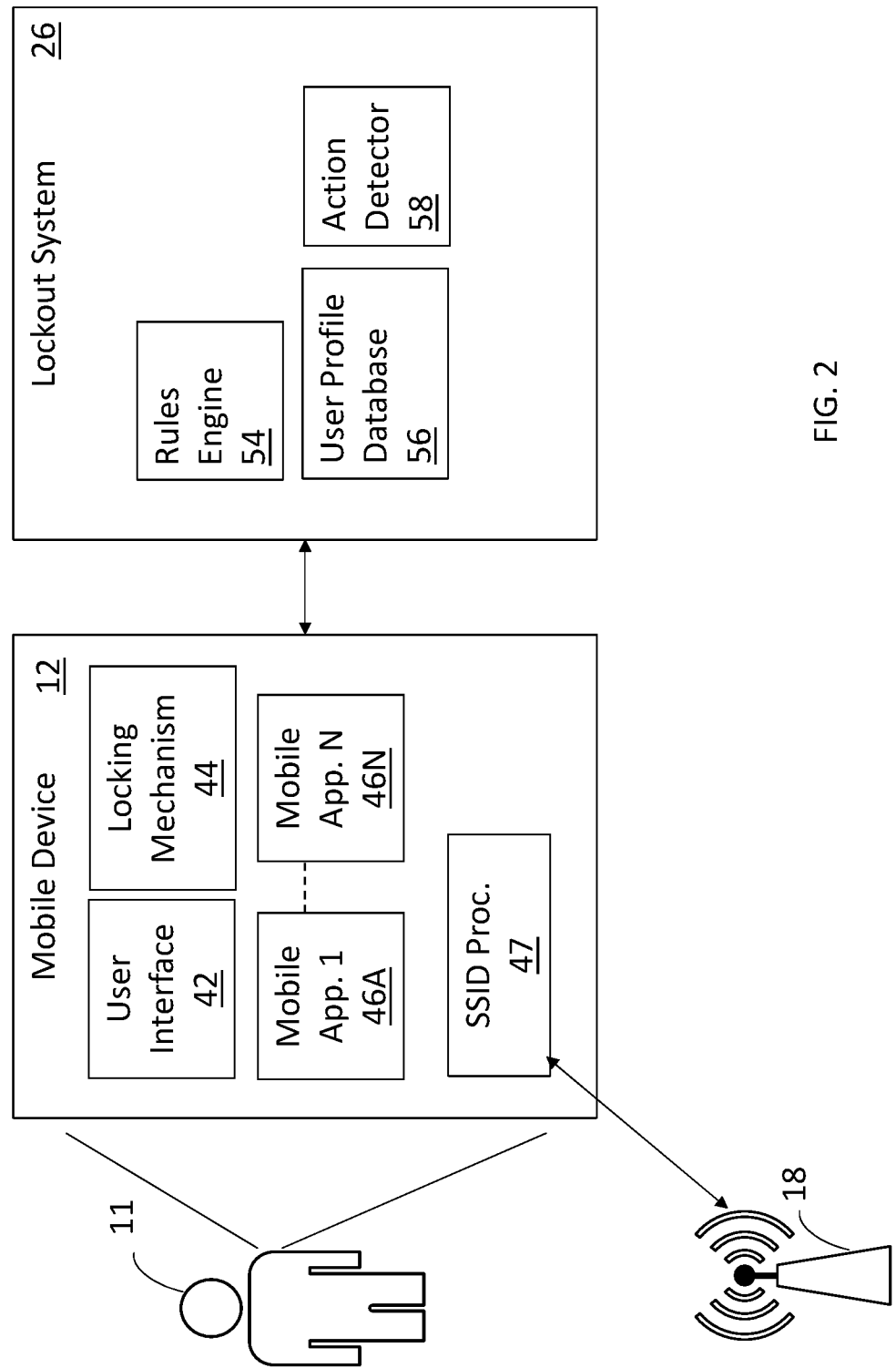
FIG. 2 illustrates a logical architecture overview of a system for controlling mobile device use, in accordance with some embodiments.

FIG. 2 illustrates a logical architecture overview of a system for controlling mobile device use. Specifically, FIG. 2 shows further details of the mobile device 12 and the lockout system 26 of FIG. 1.

As shown in FIG. 2, the mobile device 12 can include a user interface 42, a locking mechanism 44, one or more applications 46A-46N (generally, 46) (where N is an integer greater than 0) that are stored in a memory, such as a random access memory (RAM), a read-only memory (ROM), or other storage device, and executed by one or more hardware processors (not shown). The hardware processors can be part of one or more special-purpose computers, such that execute computer program instructions which implement one or more functions and operations of the mobile device 12 and/or the lockout system 26, for example, specified in the blocks and decision diamonds of the flowchart of FIG. 3, described below.

The user interface 42 interacts with the applications 46 for electronically presenting application-related data on a screen of the mobile device 12. In doing so, the user interface 42 may include one or more user input devices and output devices, such as a display screen (e.g. a liquid crystal display (LCD) or light emitting diode (LED) screen or touch-sensitive display screen), a keyboard, an electronic thumbwheel, trackball, mousepad, and so on.

The mobile device 12 can also include a service set identification (SSID) processor 47 or other authorization scheme that permits admittance of the mobile device 12 to the store's wireless network 16. The WiFi access point 18 can be configured with an SSID and corresponding authorization key that, in some embodiments, are compared to a unique identifier configured at and corresponding to the mobile device 12. In some embodiments, an SSID is not broadcast, whereby the mobile device 12 is configured with appropriate authorization information, such as SSID, password such as Wireless Encryption Protocol (WEP) or, Wi-Fi Protected Access (WPA), and so on for establishing communication with the network 16 during a bootup sequence. In other embodiments, the mobile device 12 is configured as a BYOD device, which is not connected directly to the internal network 16. Instead, connection can be established through an open SSID or the like, for example, using a modem or other input/output device on the mobile device 12.

The locking mechanism 44 can be constructed to determine if the SSID is in the relevant network 16, and for attempting to establish a connection with the network. When the network 16 confirms that the SSID is valid but the password or the like is incorrect, the system recognizes that the mobile device 12 is within range of the internal network 16. However, the connection is not established due to the unavailable password or the like, since in this embodiment, the device 12 is not store or company owned.

In some embodiments, the locking mechanism 44 is physically resident on the mobile device 12, for example, embedded in firmware at the device 12, and is configured to lock one or more applications 46, and/or lock hardware elements of the mobile device 12 to prevent or restrict use of the mobile device 12, and/or applications, when the locking mechanism fails to detect the store WiFi network 16, or fails to authenticate with the store WiFi network 16, and/or for other reasons described herein. The locking mechanism 44 can also be configured to establish an ownership of the device 12, for example, whether the device 12 is owned by the retail establishment 14 which employs the user 11. The locking mechanism 44 can lock or allow specific work-related applications 46 on the mobile device 12 depending on the ownership of the device 12, but under the control and use by a store associate, employee, agent, or the like.

In embodiments where the mobile device 12 is store or company owned, a registry setting or login to the mobile device 12 can provide a manner in which user profile data is provided. Here, a profile may install registry entries, for example, including global variables, on the mobile device 12. In some embodiments, the profiles can be configured so that the device 12 pings or otherwise searches for an SSID signal, for determining when the device 12 is within range of the signal. Upon receipt of the signal, applications 46 may be displayed that may be used by the user, for example, work-related applications. In other embodiments, the registry entries may be used to identify the owner 11 of the device 12, or a user group, and establish rights and privileges of the user or group, for example, permitting the user to operate the device 12 outside the network 16. Here, applications 46 that allowed to operate outside the network 16 may be displayed, while applications 46 prohibited from use outside the network 16 are not displayed, or are otherwise locked to prevent the user from executing these applications. In other embodiments, the device 12 may search for an SSID signal or the like when an application 46 on the mobile device 12 is selected.

In other embodiments, the locking mechanism 44 is part of an application 46. When the application 46 is launched, if a signal is seen, then the device 12 operate in a normal manner. If a signal is not seen, then the locking mechanism 44 can determine if the application can be used outside the store network 16. If so, then a login screen may appear on the user interface 42. The login can determine the rights of the user 11, for example, by accessing a user profile. If the user is determined to be salaried, then the mobile device 11 operates according to options, for example, established by a rules engine 54 described below, that are available to the device 12 outside the store network 16. The locking mechanism 44 can search in a predetermined and periodic manner for a signal, and in response, adjust the options in the application when the signal is seen. On the other hand, if the user is a wage earner, for example, established at the user profile database 56, then the application 46 may be locked, or otherwise prohibited from use.

The lockout system 26 includes a rules engine 54, a user profile database 56, and an action detector 58.

The rules engine 54 provides the rules that establish the conditions under which the mobile device 12 is locked. The mobile device 12 is locked and unlocked in accordance with the rules. The rules may be defined by an administrator or other authorized party. For example, the rules engine 54 can be configured to apply one or more rules that determine an action to be applied to the mobile device 12 based on a user's action or task performed at the mobile device 12, a location of the mobile device 12, whether the mobile device 12 is store-owned, leased, or the like, and/or a combination thereof. In particular, the rules engine 54 permits the authorized party to establish the criteria under which the mobile device 12 can be locked. This can be achieved by inputting the rules from a device user interface, or by importing rules from a remote source, for example, another application. The mobile device 12 operates according to the rules loaded at the rules engine 54. For example, in accordance with the rules engine 54, the mobile device 12 can filter available access or activities within a particular application, depending on whether the mobile device 12 is store-owned. Although the rules engine 54 is shown in FIG. 2 as being in the lockout system 26, which is separate from and in communication with the mobile device 12, in other embodiments, the rules engine 54 can be resident in an application 46 at the mobile device 12, or in the user profile database 56, or in the device firmware, for example, executed during bootup. The lockout system 26 can therefore provide features that may not be covered by the locking mechanism 44 in the phone, or to provide data that may be needed by the locking mechanism to operate, and that resides external to the phone.

For example, during operation, the rules engine 54 may establish that a store-owned mobile device 12 is to enter a lockout state where the mobile device 12 is inactivated if the mobile device 12 does not receive or recognize a signal, for example, including an SSID, from the store network 16 indicating that the mobile device 12 is in the vicinity of the store network 16. A related rule may establish that if the signal is recognized by the mobile device 12, then the mobile device 12 has access-based authorization, for example, with respect to executing relevant applications on the mobile device 12, or filtering available access or activities within a particular application, for example, the agent's access level, or access level of the configured mobile device, is less than a predetermined threshold access level. In some embodiments, the rules engine 54 coexists with the locking mechanism 44 at the mobile device 12.

The user profile database 56 includes user profiles or the like indicating whether the user of the mobile device 12 is a salaried employee, a wage earner, or other employment status indicator. Other external mechanisms can alternatively or in addition provide relevant data to the user profile database 56, for example, a company human resource server, which includes profile data that can be provided to the user profile database 56. In this example, a wage earner (distinguished from a salaried employee) may be prevented from performing work-related functions on a mobile device 12 used by, and possibly owned or leased by, the wage earner when the wage earner is "off the clock" and/or outside of the store's WiFi perimeter 17. The user profile database 56 may receive such information from a registry setting (described herein), or during a login session with the mobile device 12.

The rules engine 54 can be populated with the contents of the user profile database 56, for generating an output to the mobile device 12 used for determining the conditions under which the mobile device 12, one or more applications 46, or tasks or actions regarding a particular application, may be prevented from use. For example, if the user is a wage earner and the mobile device 12 does not receive a wireless signal from the store network 16, then the locking mechanism 44 on the mobile device 12 can close applications 46 on the mobile device 12 prohibited for use by the mobile device user outside of the WiFi perimeter 17 of the network 16. The system may establish whether a wage earning user is "on the clock" by checking for the user status during a login of the mobile device 12, or communicating with an application on the mobile device 12 that communicates with registry entries that establish user permissions, conditions for application, feature, or task-level permissions, for example, whether the user is permitted to operate the device 12, or use a particular application 46, or feature of the application 46, outside the network. The locking mechanism 44, regardless of location, e.g., on the device 12 or external to the device 12, can communicate with a time clock system or other system that tracks the user's work time during predetermined time intervals.

The action generator 58 monitors tasks or other actions performed with respect to the applications 46 of the mobile device 12. As described above, an application 46 may run on the mobile device 12, and may be permitted for some uses, but not other uses. For example, an email application may operate so that the user can send email messages via the email application to friends and family, but may be prohibited from sending or receiving work-related emails during non-business hours. This feature can prevent wage earning employees from using their mobile devices to perform work-related tasks off the clock. In another example, a feature may include binning, where items are systematically placed in a storage area. More specifically, binning relates to a process of placing overstocked items in the bin or other storage container in a backroom or overstock area. An associate would use an electronic device to scan the location for placing the items. They would then scan the merchandise items. If they are not physically there, the associate may not perform this task. However, they might try to complete the task to show others that the associate complete his or her assigned work.

Figure 3:
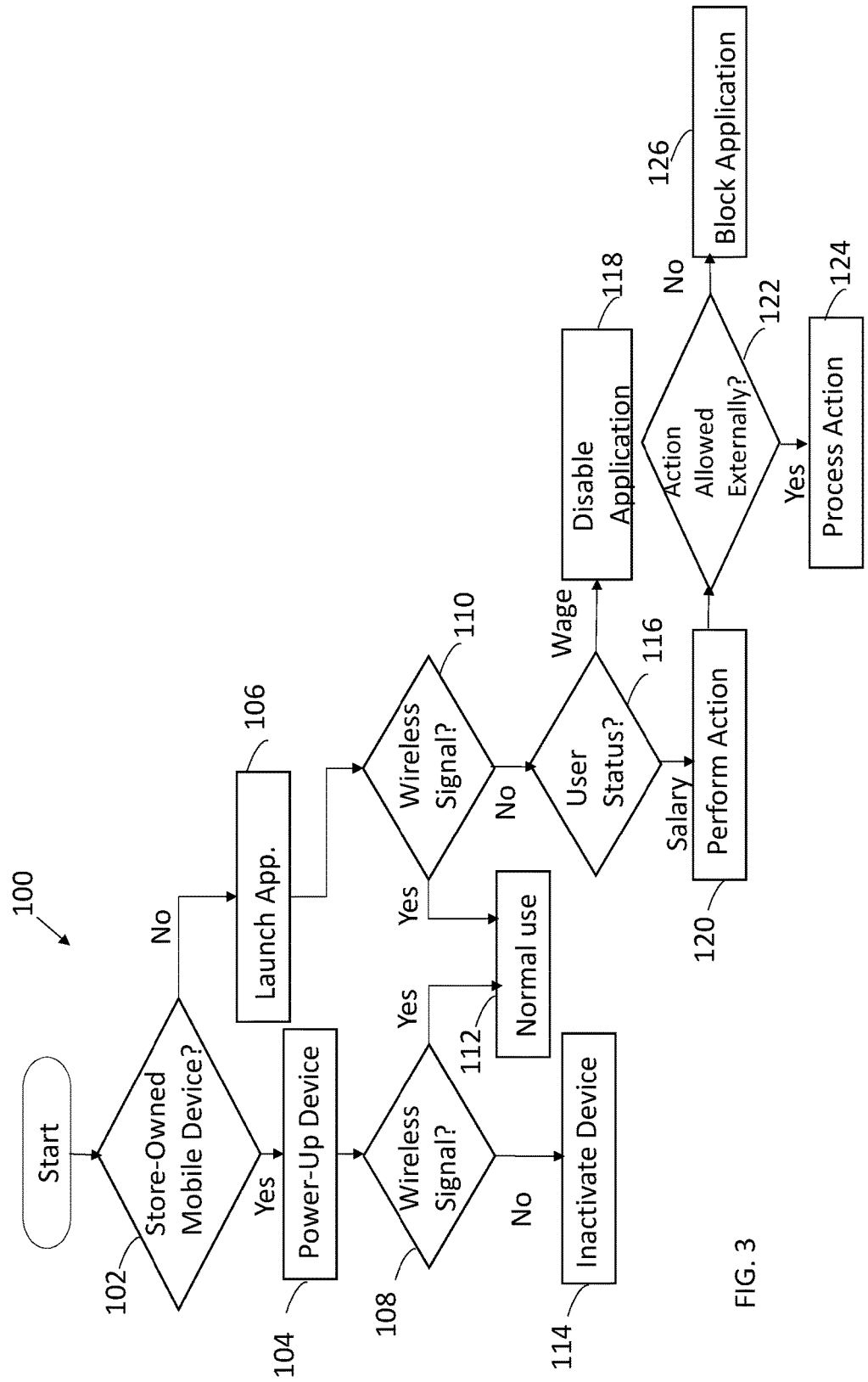
FIG. 3 is a flowchart of a method for controlling mobile device use, in accordance with some embodiments.

FIG. 3 is a flowchart of a method 100 for controlling mobile device use, in accordance with some embodiments. In describing the method 100, reference is made to elements of FIGS. 1 and 2.

At decision diamond 102, a determination is made whether the mobile device 12 is owned, leased, or otherwise under the control of the retail establishment, e.g., workplace facility such as a store, which employs the user 11 of the mobile device 12. In some embodiments, the determination is made based on the presence of the locking mechanism 44 at the mobile device 12, for example, embedded in firmware of the device 12. In other embodiments, registry entries can be provided by the user profile database 56, and installed at the mobile device 12, which are used to identify the owner of the device 12. As described herein, the registry entries can also or alternatively identify users who may operate outside the network 16, indicate which applications may be used, and so on. Profiles can be configured to permit the device 12 to ping for or otherwise search for an SSID signal or the like, for example, to determine whether the device 12 is within range of the signal. A list of applications or features permitted to be used may be displayed. In other embodiments, ownership of the device 12 established upon login of an application 46 that includes the locking mechanism 44.

When a determination is made that the mobile device 12 is owned, leased, or otherwise under the control of the store, then the method 100 proceeds to block 104, where the mobile device 12 can be activated, or turned on. Otherwise, if a determination is made at decision diamond 102 that the mobile device is not store owned, then the method proceeds to block 106, where a particular application 46 on the mobile device 12 can be launched. Prior to this, the mobile device 12 is turned on so that the application 46 can be executed. Here, the user 11 may own, lease, rent, or otherwise have access to and control over the mobile device 12. However, the specific launched application permits the user 11 to perform work-related tasks from the mobile device 12 using the executed application 46 on the mobile device 12. In some embodiments, the locking mechanism 44 is part of the executed application 46.

Returning to block 104, the method 100 proceeds to decision diamond 108 where, in response to the activation of the mobile device 12 at block 104, a determination is made whether a wireless signal is detected from the store network 16. For example, the mobile device 12 may, during bootup, receive and recognize a service set identification (SSID) for the store's wireless network. If the wireless signal is detected by the mobile device 12, then the method 100 proceeds to block 112, where the user can enjoy normal use of the mobile device 12. In doing so, the mobile device 12 can operate in a well-known manner, for example, phone calls can be placed from or received at the mobile device 12, smartphone applications can be launched without intervention, and so on. Otherwise, if the wireless signal is not detected, for example, a relevant SSID is not found, then the method 100 proceeds to block 114, where the mobile device 12 is inactivated. In some embodiments, the mobile device 12 can be powered off. In other embodiments, an information screen may be displayed at the mobile device 12 indicating conditions under which the mobile device 12 may operate, for example, specific locations where the mobile device 12 can be used, and/or features of the mobile device 12 that may be used. Other forms of inactivation may include the preventing of bootup or load with limited functionality, hiding or inactivating unauthorized mobile device applications, preventing applications from deploying, hiding or preventing options in an application, and/or only allowing certain actions, or predetermined actions, to be performed. An example of limited functionality may include limited call features, for example, limited phone numbers that may be dialed, instructions on device use, and so on.

Returning to block 106, after the application is launched, the method 100 may proceed to decision diamond 110, where a determination is made whether a wireless signal is detected from the store network 16. For example, the mobile device 12 may receive and recognize a service set identification (SSID) for the store's wireless network. In another example, the SSID is preconfigured at the device instead of being broadcast, for example, where the device 12 does not access the internal store network 16, but instead connects to other networks via an open SSID or the like. In configurations where the mobile device 12 looks for and detects a wireless signal, the method 100 proceeds to block 112, where the user 11 can enjoy normal use of the mobile device 12. Otherwise, if the wireless signal is not detected, then the method 100 proceeds to decision diamond 116, where is the user status is determined, for example, whether user 11 of the mobile device 12 is a salaried employee or an hourly or wage-earning employee, contractor, or other non-salaried agent. As described herein, registry entries may be used to identify the owner of the device 12, or a user group. In other embodiments, the user status is determined during a login procedure with an authentication device or the like. If a determination is made that the user 11 of the mobile device 12 is an hourly or wage-earning employee, contractor, or other non-salaried agent (by registry settings, login, or other technique in accordance with some embodiments), then the method 100 proceeds to block 118, where the application 46 is disabled, or otherwise inactivated so that the wage-earning user 11 cannot use the application 46 on the mobile device 12.

Otherwise, the method 100 proceeds to block 120 upon a determination that the user is not an hourly or wage-earning employee, contactor, or other non-salaried agent, where the salaried user performs an action related to the application, for example, executes the application on the mobile device 12 and uses the application to perform a work-related task. For example, the action may be the user executing an application that generates a sales report pertaining to item sales at the store. If the user 11 is a salaried user, then options that are available outside the network 16 may be displayed or otherwise provided to the user 11. The locking mechanism 44 may continue to search for a signal related to the application 46, and adjust options in the application 46 when the signal is detected.

At decision diamond 122, a determination is made whether the action or task performed on the application of block 106 is allowed to be performed outside the store, in particular, outside the store network 16. As described above, in some embodiments, registry entries can establish whether the user is permitted to operate the device 12 outside the network 16. In other embodiments where the locking mechanism 44 is coded in the application 46, upon application launch, the locking mechanism 44 determines after login whether the application can be used outside the store network 16. If the action or task is allowed to be performed outside the store network 16, then the method 100 proceeds to block 124, where the action can be performed on the application of block 106. Otherwise, at block 126, the action is blocked. In some embodiments, the locking mechanism 44 is used to display a task that can be used. In other embodiments, a communication may be initiated by the application 46 to an intended system for performing a task. Here, the locking mechanism 44 may intercept the communication, and inform the user, for example, by a displayed message, that the application is blocked.

As will be appreciated by one skilled in the art, aspects of the disclosed system and method for determining a sequence for a plurality of tasks may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for operating a mobile device, comprising:
   determining, by a locking mechanism at the mobile device, whether the mobile device is store-owned or user-owned;
   searching, by the mobile device, for a signal from a network;
   inactivating the mobile device in response to a determination that the device is store-owned and that the signal is not detected; and
   controlling a use of at least one application executable by the mobile device in response to a determination that the mobile device is user-owned and that the signal is not detected and further in response to a determination of a user status with respect to the user-owned mobile device.

2. The method of claim 1, wherein inactivating the mobile device comprises at least one of preventing a bootup of the mobile device, preventing applications of the mobile device from deploying, preventing applications from displaying as an option, and allowing certain actions to be performed in an application.

3. The method of claim 1, wherein the signal of the network is searched in response to executing the at least one application by the mobile device.

4. The method of claim 1, further comprising authorizing the mobile device to operate in a predetermined vicinity of the network when the signal is detected from the network.

5. The method of claim 4, wherein the vicinity of the network includes a workplace facility, and wherein the mobile device is operated by an agent of the workplace facility.

6. The method of claim 1, further comprising, installing registry entries from the profile on the mobile device, permitting the mobile device to search for the signal from the network.

7. The method of claim 6, wherein the registry entries include data for identifying an owner of the mobile device, and wherein the application of the applications is permitted to operate depending on the owner of the mobile device.

8. The method of claim 1, wherein the mobile device is a bring your own device (BYOD), and the owner of the mobile device and the user of the mobile device are the same.

9. The method of claim 1, wherein the signal is detected but the mobile device is not authenticated, and is prohibited from connecting to the network.

10. A system for controlling access of a mobile device, comprising:
    a locking mechanism that determines whether the mobile device is store-owned or user-owned, searches for a signal from a network, and inactivates the mobile device in response to a determination that the mobile device is store-owned and the signal is not detected; and
    a lockout system that includes a rules engine for establishing conditions under which the mobile device or at least one application of the mobile device are locked.

11. The system of claim 10, wherein the lockout system searches for the signal after at least one of power-up of the mobile device and after an application is launched at the mobile device.

12. The system of claim 10, wherein the locking mechanism determines an access level of the mobile device, and locks the mobile device or the application in response to the access level being less than a predetermined threshold.

* * * * *